(12) United States Patent
Gabriel et al.

(10) Patent No.: US 8,196,721 B2
(45) Date of Patent: Jun. 12, 2012

(54) HYDROPNEUMATIC SPRING AND DAMPER SYSTEM

(75) Inventors: Stefan Gabriel, Neuhausen (CH); Michael Kleiber, Dachsen (CH); Volker Triebs, Wutöschingen (DE); Roland Züllig, Hallau (CH)

(73) Assignee: Stromsholmen AB, Tranas (SE)

( * ) Notice: Subject to any disclaimer, the term of this patent is extended or adjusted under 35 U.S.C. 154(b) by 1078 days.

(21) Appl. No.: 12/112,897

(22) Filed: Apr. 30, 2008

(65) Prior Publication Data

US 2009/0107784 A1 Apr. 30, 2009

(30) Foreign Application Priority Data

Oct. 26, 2007 (EP) .................................... 07119441

(51) Int. Cl.
*B60G 17/04* (2006.01)
(52) U.S. Cl. ....................... 188/274; 188/276
(58) Field of Classification Search .................. 188/274, 188/276, 277, 278; 267/64.11, 114, 118, 267/119, 130
See application file for complete search history.

(56) References Cited

U.S. PATENT DOCUMENTS

| | | | | |
|---|---|---|---|---|
| 4,616,810 A * | 10/1986 | Richardson et al. | ........... | 267/218 |
| 5,220,983 A * | 6/1993 | Furrer et al. | ................... | 188/274 |
| 5,392,886 A * | 2/1995 | Drummond | .............. | 188/322.19 |
| 5,927,071 A * | 7/1999 | Asanuma et al. | ............... | 60/396 |
| 6,170,621 B1 | 1/2001 | Nakahara | | |
| 6,170,809 B1 * | 1/2001 | Cotter | ........................... | 267/119 |
| 6,247,683 B1 * | 6/2001 | Hayakawa et al. | ......... | 267/64.11 |
| 2005/0178626 A1 * | 8/2005 | Turner et al. | ................ | 188/322.2 |

FOREIGN PATENT DOCUMENTS

| | | |
|---|---|---|
| DE | 19648050 | 6/1997 |
| DE | 19935931 | 2/2000 |
| EP | 1559596 | 8/2005 |
| WO | 88/00535 | 1/1988 |
| WO | 2005/073000 | 8/2005 |
| WO | 2005/073001 | 8/2005 |

* cited by examiner

*Primary Examiner* — Christopher Schwartz
(74) *Attorney, Agent, or Firm* — Fay Sharpe LLP; Brian E. Turung

(57) ABSTRACT

The hydro-pneumatic spring damping device in particular for wheeled vehicles or tracked vehicles includes at least one hydro-pneumatic element (1) having a gas chamber (1*h*) wherein the hydro-pneumatic element (1) includes a heat exchanger (1*i*) which is arranged such that it influences the temperature of the gas in the gas chamber (1*h*) and wherein a heat exchanger (1*i*) can be connected to a cooling device (21) via a coolant circuit (21).

15 Claims, 13 Drawing Sheets

HYDROPNEUMATIC SPRING AND DAMPER SYSTEM

Figure 1:
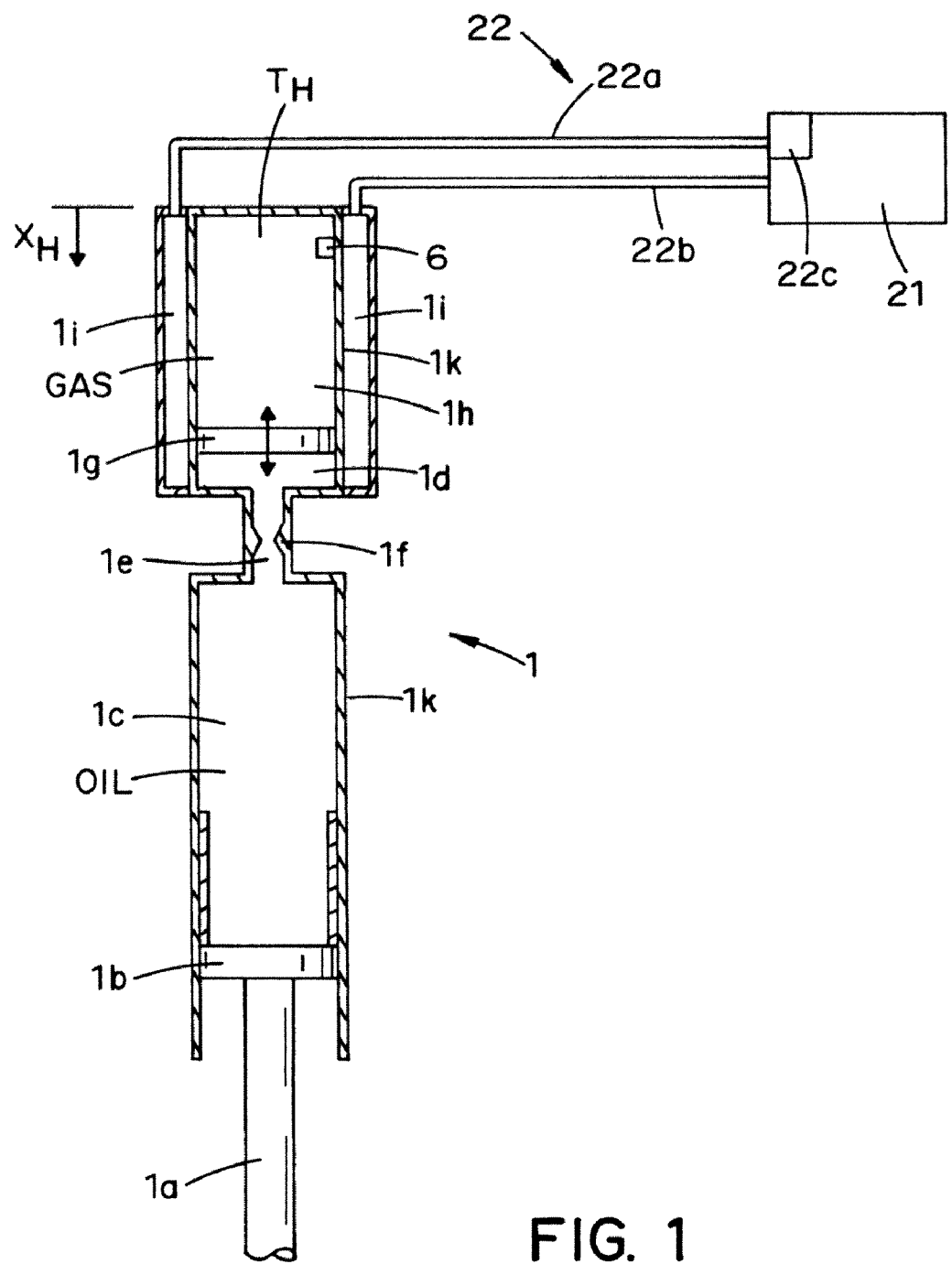

The invention relates to a hydro-pneumatic spring damping device. In particular, the invention relates to a hydro-pneumatic spring damping device that includes at least one hydro-pneumatic element having a gas chamber, wherein the hydro-pneumatic element includes a heat exchanger configured to allow changing temperature of a gas in the gas chamber and wherein the heat exchanger is fluidly coupled to a cooling device via a coolant circuit. The hydro-pneumatic spring damping device can include a coolant circuit that is designed such that at least two of the hydro-pneumatic elements can be individually cooled in dependence on the temperature measured by the temperature sensor of the respective hydro-pneumatic element.

A hydro-pneumatic spring damping device includes generally a gas volume and a liquid volume which are received in a fixed housing combination across a partition piston. The hydro-pneumatic spring damping device includes three chambers. A first chamber is intended for taking up a liquid volume. This liquid volume can be changed in that housing parts are pushed together or pulled apart in one or other way and means. A second chamber is fluid-conductingly connected to the first chamber via a restrictor. The second chamber is provided for receiving a liquid from or dispensing it to the first chamber. The liquid volume of a first chamber and of the second chamber taken together is constant. The third chamber is filled with a compressible medium such as for example gas. The third chamber is separated from the second chamber by a partition element, for example a movable piston or a membrane.

The hydro-pneumatic spring damping device is for example able to be secured on the one hand to the frame of the vehicle and on the other hand to a movable axis or to a movable wheel suspension. A movement between the two attachment points brings about a change in volume of the first chamber. In this way the medium in the third chamber is compressed or decompressed via the second chamber. This brings about spring compression or extension. The movement is in particular damped by the fluid flowing via the restrictor, in that the fluid flows to and fro via the restrictor between the first chamber and the second chamber. A hydro-pneumatic spring damping device is also termed a hydro-pneumatic spring or hydro-pneumatic element. In the following the term hydro-pneumatic element will be used.

A disadvantage of vehicles equipped with hydro-pneumatic elements is the fact that the spring behaviour of the individual hydro-pneumatic elements can change as a result of environmental influences such as changes in temperature or different operating states, also during the operation, which, for example, has the consequence that the driving behaviour and/or the vehicle height of the vehicle can change. These effects particularly arise with all-terrain vehicles in which the hydro-pneumatic elements are exposed to a particularly heavy-load as a result of the unevenness of the ground. These effects are particularly disadvantageous with tracked vehicles equipped with hydro-pneumatic elements because these effects can also influence the tension of the track. The change of the track tension can have the consequence, with an increase of the track tension, of increased wear of the track, or for a track which is too loose, be the cause of the track being thrown off or a lack of ability to steer or brake the vehicle.

The document WO 2005/073001 discloses a hydro-pneumatic element which permits certain environmental influences to be compensated, at least temporarily. A disadvantage of this hydro-pneumatic element is the fact that this compensation has to be repeatedly carried out and in that a relatively complicated metering device is moreover required. The disclosure of the document WO 2005/073001 is hereby incorporated by reference.

It is thus the object of the present invention to propose a hydro-pneumatic spring damping device and also a method for the operation of a hydro-pneumatic spring damping device which have a more advantageous hydro-pneumatic element.

The object of providing a hydro-pneumatic spring damping device and also a method for the operation of a hydro-pneumatic spring damping device which have a more advantageous hydro-pneumatic element is satisfied with a hydro-pneumatic spring damping device that includes at least one hydro-pneumatic element having a gas chamber, wherein the hydro-pneumatic element includes a heat exchanger configured to allow changing temperature of a gas in the gas chamber and wherein the heat exchanger is fluidly coupled to a cooling device via a coolant circuit. The hydro-pneumatic spring damping device can include a gas chamber and an oil chamber and a restrictor and in that the gas chamber, the oil chamber, and/or the restrictor is connected to the heat exchanger. The hydro-pneumatic spring damping device can include a temperature sensor and a valve, wherein the sensed temperature is for the detection of the temperature of the gas in the gas chamber, and/or the temperature of the coolant in the coolant circuit, and wherein the valve is used to influence the quantity of coolant supplied to the heat exchanger, and wherein the valve includes a mechanical valve and a mechanical temperature sensor. The hydro-pneumatic spring damping device can include a temperature sensor and a control device, wherein the temperature sensor is used for the determination of the temperature of the gas in the gas chamber, and/or the temperature of the coolant in the coolant circuit, and wherein the control device is designed such that it detects a measured value of the sensor and, based on this measured value, controls the coolant circuit in such a way that the gas in the gas chamber is kept within a predetermined temperature range. The pneumatic spring damping device can include a coolant circuit, wherein the coolant circuit is designed such that at least two of the hydro-pneumatic elements can be individually cooled in dependence on the temperature measured by the temperature sensor of the respective hydro-pneumatic element. The hydro-pneumatic spring damping device can include heat exchangers, wherein the heat exchangers of a plurality of hydro-pneumatic elements are connected in series one after the other to the coolant circuit. The hydro-pneumatic spring damping device can include heat exchangers, wherein the heat exchangers of a plurality of hydro-pneumatic elements of hydro-pneumatic elements are connected mutually in parallel to the coolant circuit. The hydro-pneumatic spring damping device wherein the hydro-pneumatic elements connected to the coolant circuit can form the cooling device. The hydro-pneumatic spring damping device wherein the gas chamber of at least one hydro-pneumatic element can be flow-technically connected via a control valve to a metering device including a sensor for the determination of position, in particular to detect the length of the hydro-pneumatic element or the rotation of the hydro-pneumatic element with respect to a reference position and also including a gas compensation control device, with the gas compensation control device being designed such that it controls the metering device and the control valve in such a way that a compensation volume can be supplied to or removed from the gas chamber. The hydro-pneumatic spring damping device wherein the gas chamber of at least one hydro-pneumatic element can be flow-technically connected to a metering device including a sensor for the determination of the pressure of the gas in the gas chamber including a sensor for the determination of position, in particular for a determination of the length of the hydro-pneumatic element or of the rotation of the hydro-pneumatic element with respect to a reference position and also including a as compensation control device wherein the gas compensation control device is designed such that it detects the measured values of a sensor, and, based on these measured values, controls the metering device and the control valve in such a way that a compensation volume can be fed to or re-moved from the gas. The hydro-pneumatic spring damping device wherein the first oil chamber parts and/or the second oil chamber parts of at least one hydro-pneumatic element can be flow-technically connected by an oil metering device to an oil supply, including a sensor for the determination of position, in particular for the determination of the length of the hydro-pneumatic element or the rotation of the hydro-pneumatic element with respect to a reference position and also including a compensation control device, with the compensation control device being designed such that it controls the oil metering device in such a way that an oil compensation volume can be supplied to or removed from the first oil chamber parts and/or the second oil chamber parts. The object can also be accomplished by a method of controlling a hydro-pneumatic spring damping device that includes at least one hydro-pneumatic element having a gas chamber, comprising a step of reducing a temperature of a gas in the gas chamber using a coolant circuit. The method can have at least one of the gas chambers, an oil chamber and a restrictor of the hydro-pneumatic element to be cooled. The method can have the gas chamber of the hydro-pneumatic element be heated with a cool spring damping device. The method can have at least one hydro-pneumatic element be fluidly coupled to a metering device, wherein a pressure of the gas in the gas chamber of the hydro-pneumatic element and a length of the hydro-pneumatic element are measured, and wherein a compensation volume is fed to the gas chamber or removed from the gas chamber as a function of the measured pressure and length. The method can have at least one hydro-pneumatic element that is fluidly coupled to an oil metering device, wherein a compensation volume is supplied to or removed from the gas chamber, and wherein a position of the hydro-pneumatic element of the vehicle is measured with a sensor and, wherein optionally a further compensation volume is supplied or removed after measuring. The method can have at least one hydro-pneumatic element that is fluidly coupled to an oil metering device, wherein a compensation volume that is supplied to or removed from at least one of a first and second oil chamber parts, and wherein a position of the hydro-pneumatic elements or of the vehicle is measured with a sensor and, wherein optionally, a further compensation volume is supplied or removed. The method can have at least one of a temperature of the hydro-pneumatic element is measured and a pressure in the hydro-pneumatic element is measured, and wherein a gas compensation volume is supplied to or removed from the hydro-pneumatic element as a function of at least one of the measured temperature and the measured pressure and optionally wherein an oil compensation volume is supplied to or removed from at least one of a first and a second oil chamber part. The object can also be achieved by a vehicle that includes a hydro-pneumatic spring damping device, wherein the vehicle has an engine cooling system with a cooling power that is at least equal to a total heat generation which can be produced by the hydro-pneumatic spring damping device. The vehicle can have the engine cooling system of the vehicle have a cooling performance which is at least five (5) times the total heat generation which can be produced by the hydro-pneumatic spring damping device.

This object is in particular satisfied with a hydro-pneumatic spring damping device including at least one hydro-pneumatic element having a gas chamber, with the hydro-pneumatic element including a heat exchanger which is arranged in such a way that it influences the temperature of the gas in the gas chamber, with the heat exchanger being connected to a cooling device via a coolant circuit.

In a particularly advantageous design the gas chamber and/or the chamber containing the liquid volume is connected to a heat exchanger which is for example arranged at the outer wall of the chamber or extending within the chamber. If the heat exchanger is directly arranged at the gas chamber then heat can be directly withdrawn from this gas chamber with the aid of a heat exchanger. If the heat exchanger is only arranged at the chamber for the liquid volume, then the heat exchanger takes heat away from the liquid, which in turn has the consequence that the temperature of the gas in the gas chamber is influenced and is in particular cooled.

When a vehicle equipped with hydro-pneumatic elements travels over an uneven terrain then this has the consequence that the hydro-pneumatic elements are deflected relatively quickly and, if required, also with long spring paths, that is to say they are extended and shortened. This movement of the hydro-pneumatic elements has the consequence that the hydro-pneumatic elements heat up to an actual operating temperature, in particular as a result of the heat of friction which arises at the hydro-pneumatic element and/or of the damping heat which arises at the restrictor. Moreover, the energy exchange in the gas or gas chamber which occurs during the compression and extension of the hydro-pneumatic element has the consequence that the liquid and in particular however the gas in the hydro-pneumatic element is subjected to a continuous rapid temperature fluctuation which is superimposed on the actual operating temperature. These rapid temperature fluctuations can additionally influence the actual operating temperature of the hydro-pneumatic element, for example, the temperature of the housing of the hydro-pneumatic element. The heat exchanger acting on the hydro-pneumatic element combined with the cooling device has the consequence that the actual operating temperature is reduced, which has the consequence that the temperature of the gas volume is reduced and thus that the hydro-pneumatic element is kept in a defined operating state, for example that the temperature of the gas in the gas chamber is kept in a predetermined temperature range.

The actual operating temperature of the hydro-pneumatic element is determined by those processes which supply heat to a hydro-pneumatic element and those processes which withdraw heat from the hydro-pneumatic element. The actual operating temperature, for example the temperature measured at the housing of the gas chamber, arises as a result of those thermal processes which bring about a permanent energy input or a permanent energy withdrawal at the hydro-pneumatic element. Within the gas chamber the gas has a gas temperature which, for an actively moved hydro-pneumatic element, is subjected to a continuous rapid temperature fluctuation, with the motion-dependent temperature fluctuation normally fluctuating about the value of the actual operating temperature, i.e. being superimposed on the actual operating temperature.

In one embodiment the coolant circuit is designed as a passive system. In a particularly preferred embodiment the coolant circuit is designed as an actively controlled coolant circuit including a liquid pump, a temperature sensor and a control device which measures the temperature of the sensor and controls the fluid pump in such a way that the actual operating temperature, preferably the actual operating temperature of the gas in the gas chamber, is kept within a predetermined operating temperature range of for example 80° C. to 100° C. Water is particularly suitable as a fluid. Any other liquids such as for example oil or also gases are however also suitable as the fluid.

In an advantageous embodiment the coolant circuit is designed in such a way that each hydro-pneumatic element can be individually cooled. The coolant circuit can however also be designed in such a way that the hydro-pneumatic elements are connected in series one after the other with the same coolant circuit, so that the coolant can flow in series through the hydro-pneumatic elements one after the other. This arrangement has the advantage that a mutual temperature exchange takes place between the hydro-pneumatic elements connected in series. Assuming that a vehicle has, on one vehicle side, four vehicle wheels arranged behind one another or rollers which are each connected via a hydro-pneumatic element to the vehicle body then, depending on the arrangement, the design and the terrain which is being traveled on, this arrangement can have the consequence that the front-most hydro-pneumatic element in the direction of travel has to supply the highest damping performance and thus also experiences the highest thermal loading or the highest thermal energy input whereas the subsequent hydro-pneumatic elements experience a comparatively smaller heating as a result of the expected lower deflection of the wheel movements. The coolant circuit which connects the hydro-pneumatic elements in series after one another has the advantage that a temperature exchange, i.e. a thermal energy exchange takes place between the hydro-pneumatic elements. If the coolant for example flows from the rear-most hydro-pneumatic element in the direction of travel via the subsequently disposed hydro-pneumatic elements up to the front-most hydro-pneumatic element in the direction of travel, then the front-most hydro-pneumatic element is cooled by the rear hydro-pneumatic elements. In one embodiment a separate cooling device could also be dispensed with because certain ones of the hydro-pneumatic elements connected in series are cooler than others and thus certain hydro-pneumatic elements act as a cooling device.

The coolant circuit can be designed in a plurality of ways in order to cool hydro-pneumatic elements. The hydro-pneumatic elements can be connected individually, in series, one after the other, or mutually in parallel to the coolant circuit. Moreover the hydro-pneumatic elements can also be connected in series or in parallel in groups and these groups can in turn be connected individually, in series one after the other or mutually in parallel to the coolant circuit.

The cooling device can also be designed as a separate cooling device which exchanges the heat preferably directly with the environmental air. In a particularly preferred embodiment the coolant circuit of the hydro-pneumatic elements is however connected to the cooling apparatus of the vehicle, so that the coolant water of the radiator of the vehicle flows directly through the hydro-pneumatic elements for example. The engine cooling system of the vehicle is preferably dimensioned such that its cooling performance is at least as large as the cooling performance required for the cooling of the engine and of the hydro-pneumatic elements. Normally the vehicle is however provided with a very powerful engine so that this engine has a cooling performance which is substantially larger than the cooling performance required to cool the hydro-pneumatic elements. The engine cooling system of the vehicle has, for example, a cooling performance which is at least 5 times as large as the total heat input which can be generated by the hydro-pneumatic spring damping device. In a particularly advantageous embodiment the engine radiator of the vehicle has a cooling performance which is at least 20 times larger and indeed at least 100 times larger than the heat generated by all the hydro-pneumatic elements. A large cooling performance of the vehicle has the advantage that the cooling power which is required to cool the hydro-pneumatic elements is comparatively small, so that it is ensured that the hydro-pneumatic elements can be kept at an intended operating temperature.

Figure 2:
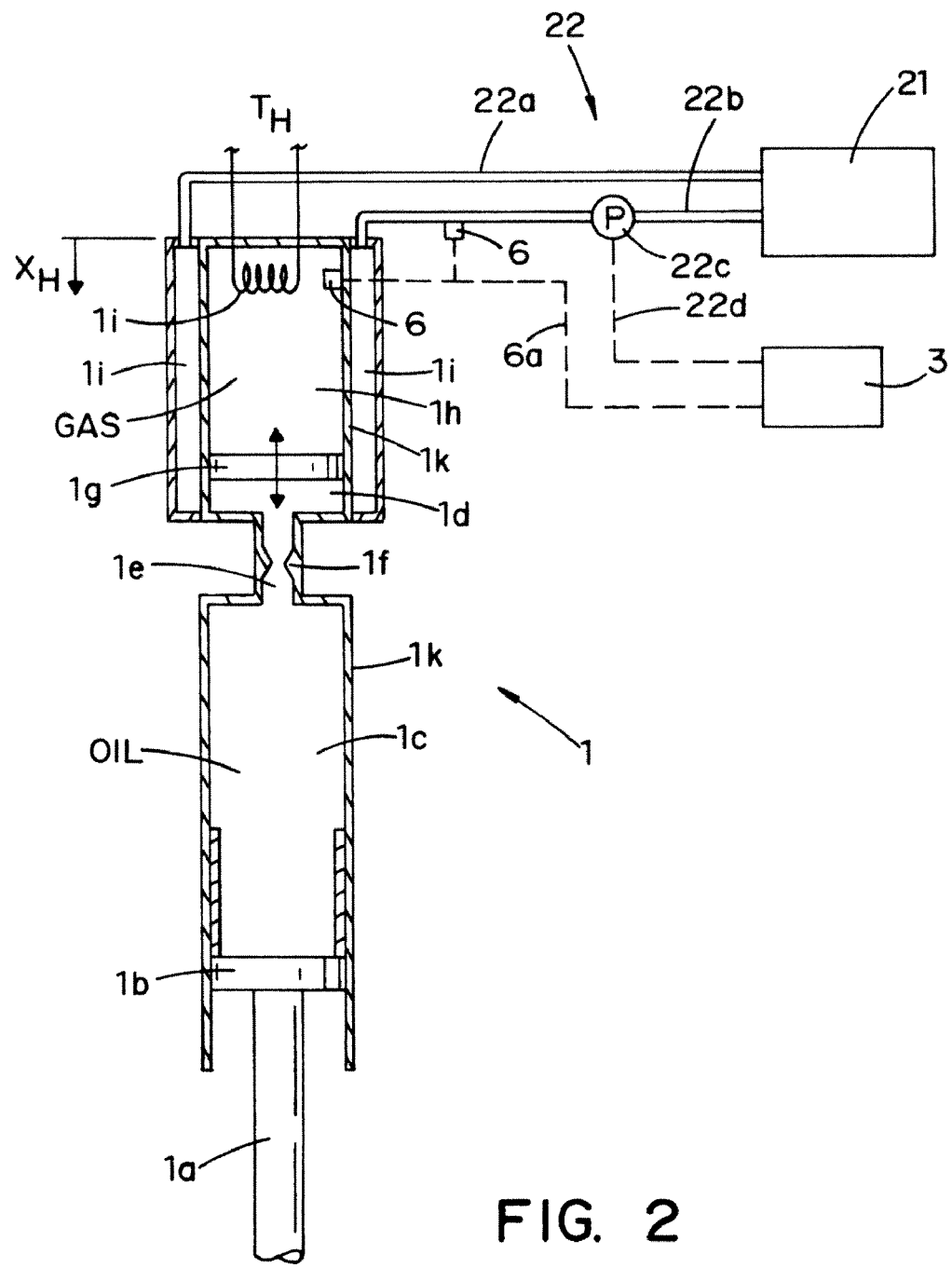
Figure 3:
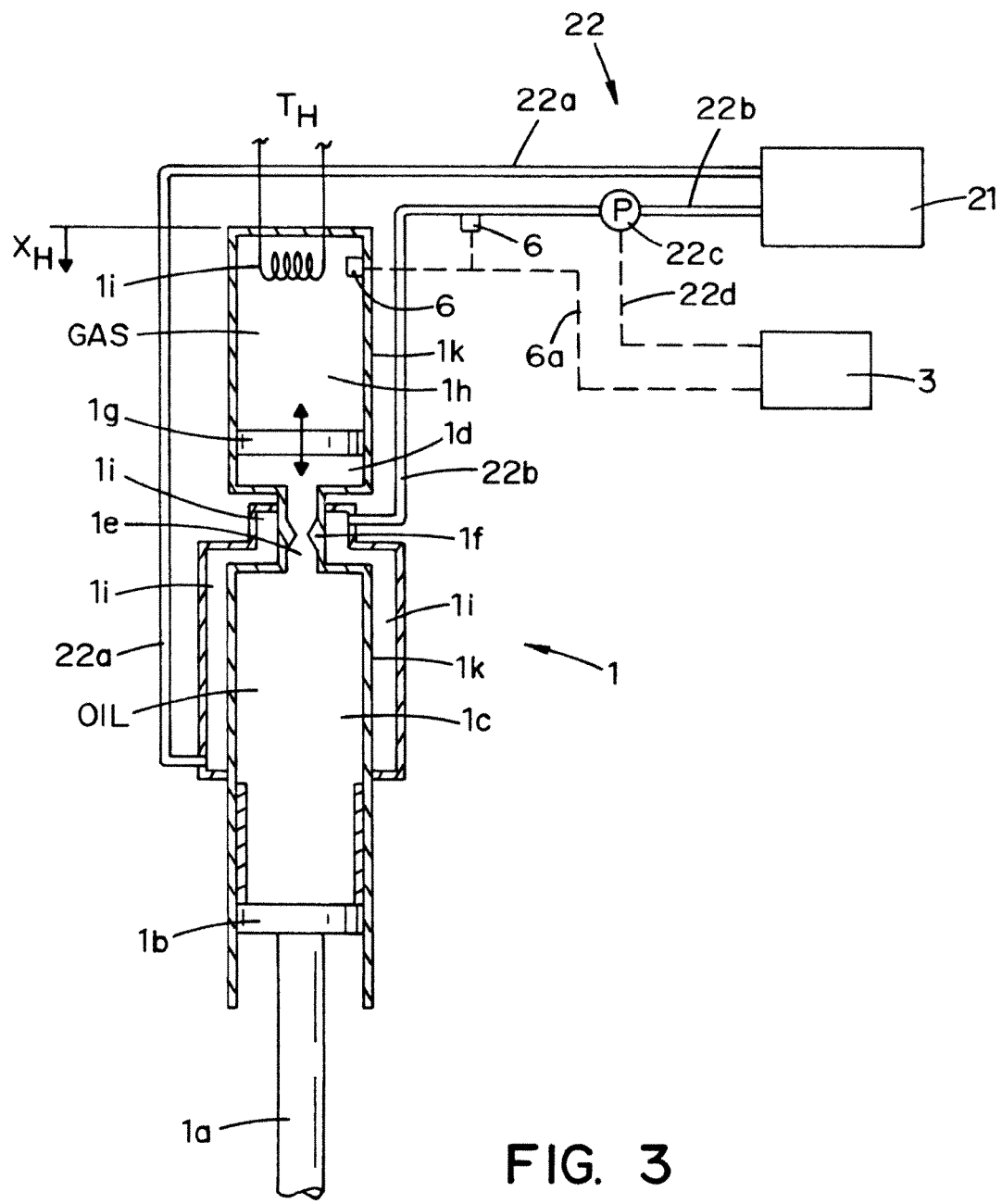
Figure 4:
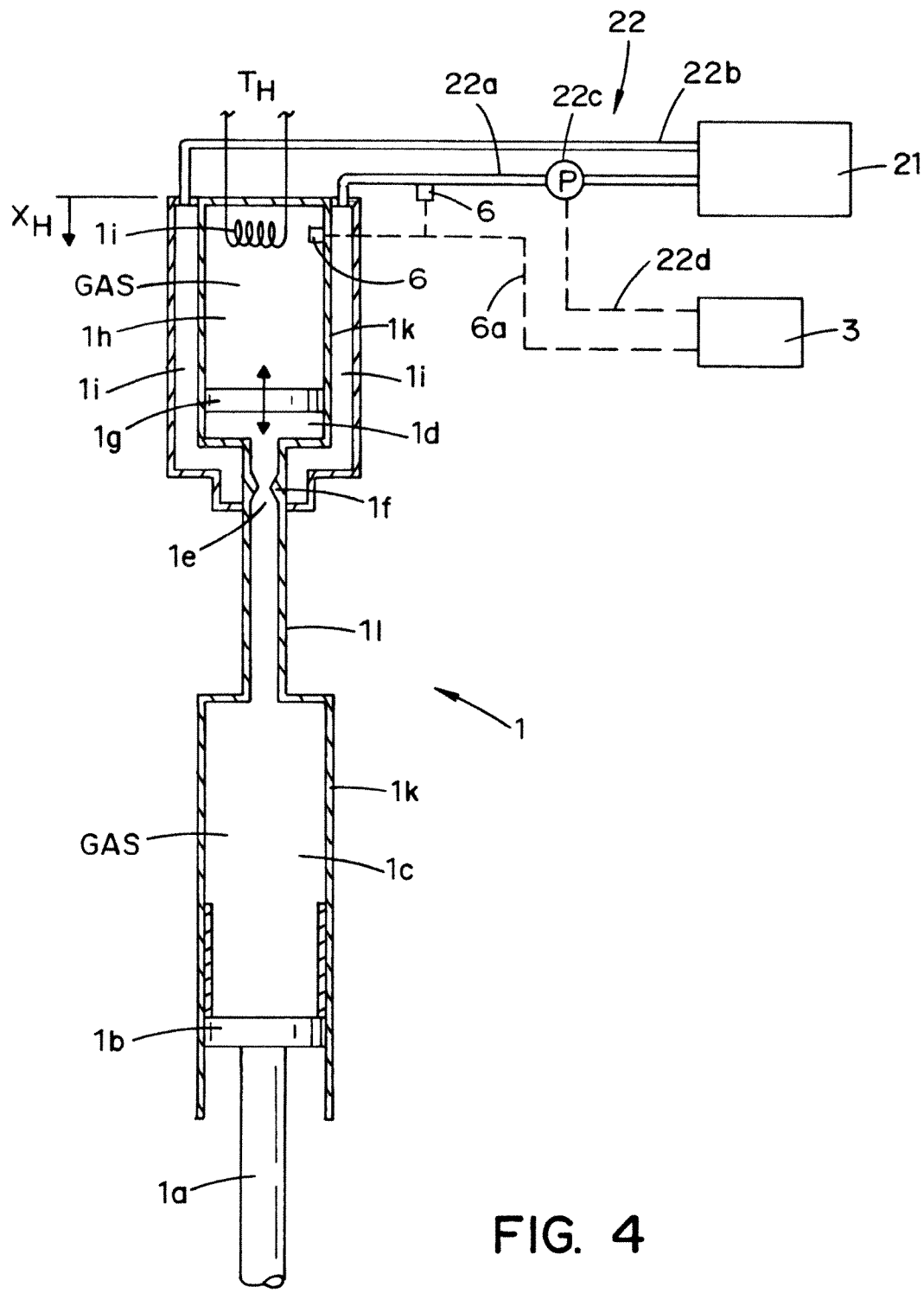
Figure 5:
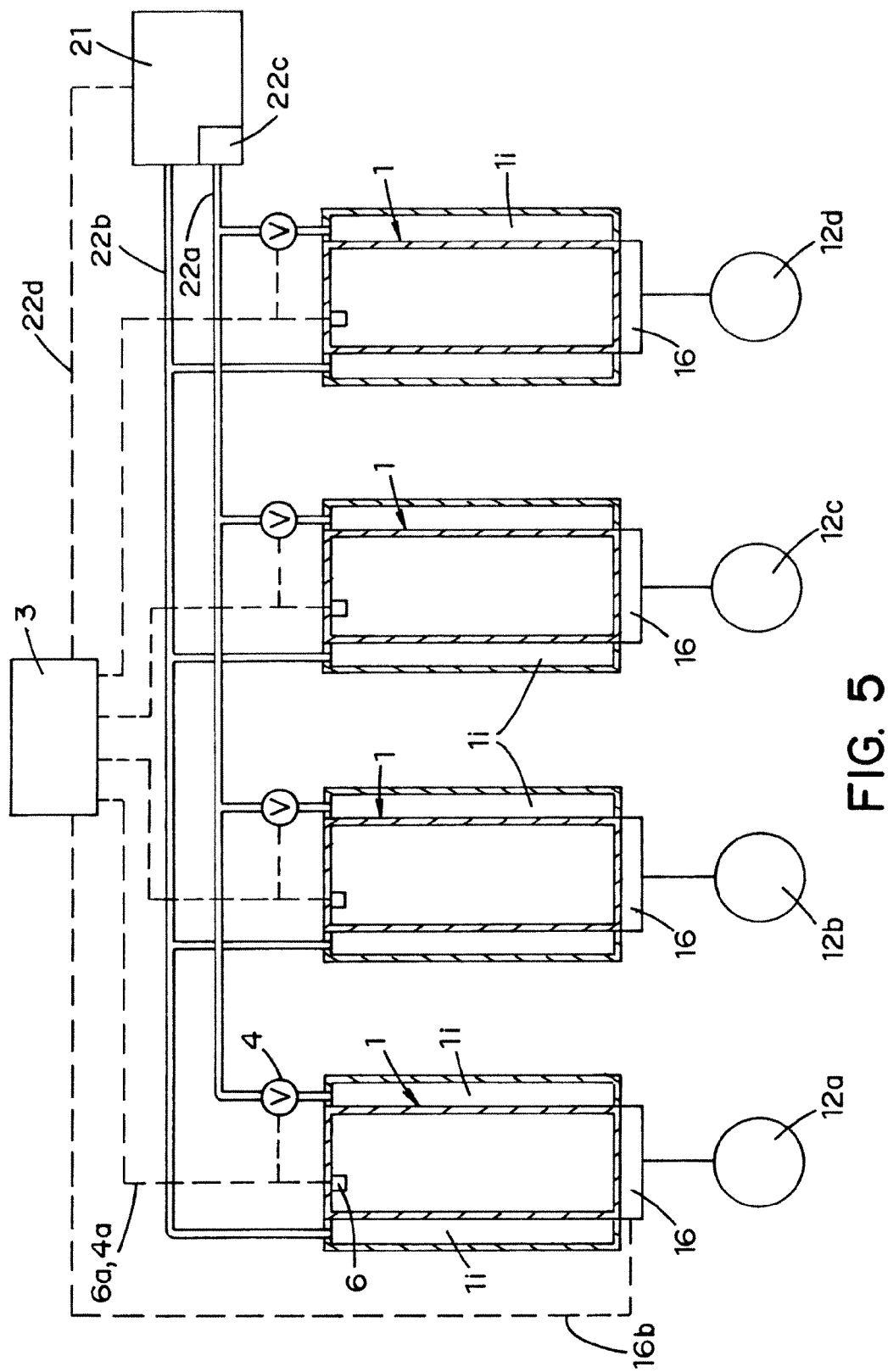
Figure 6:
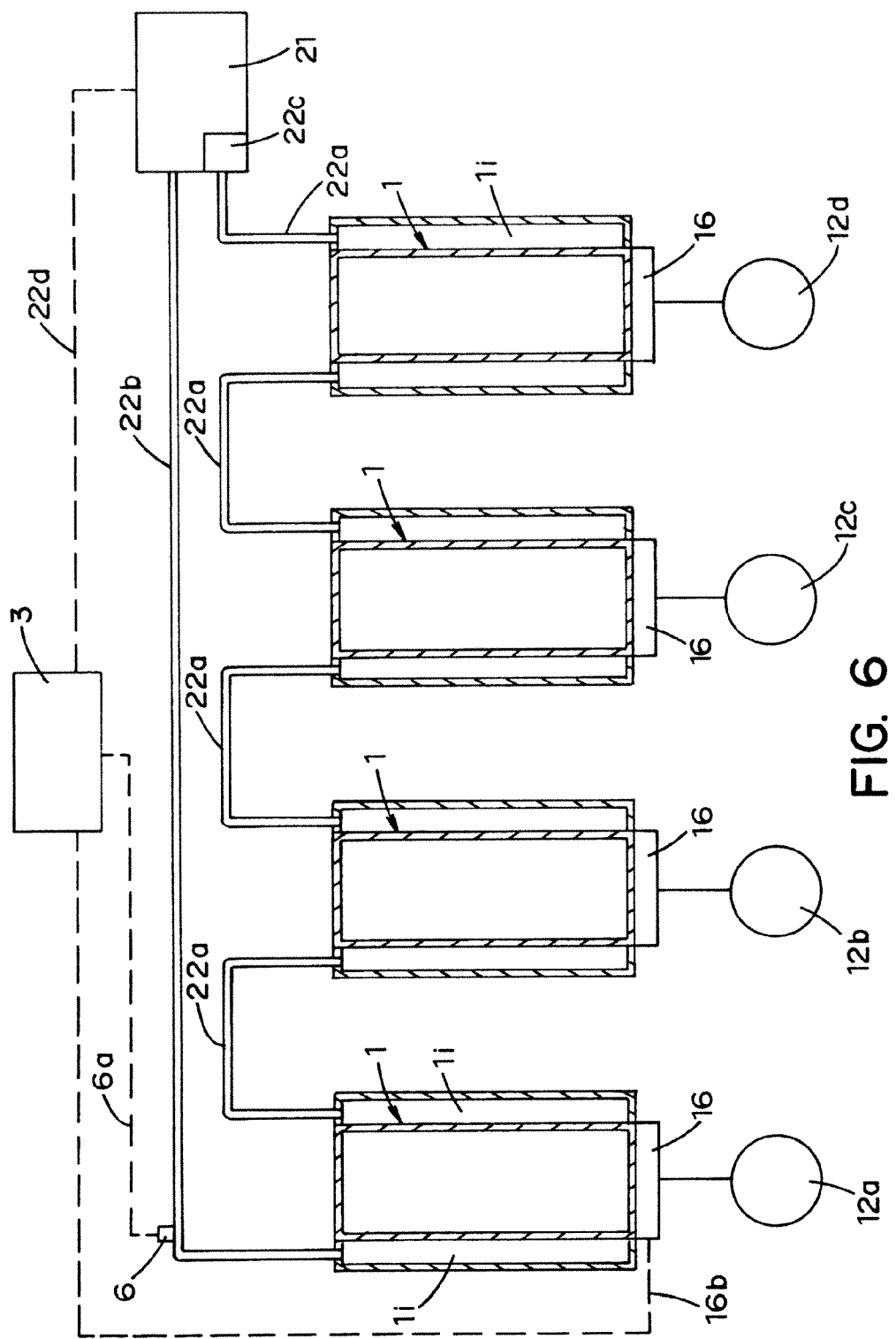
Figure 7:
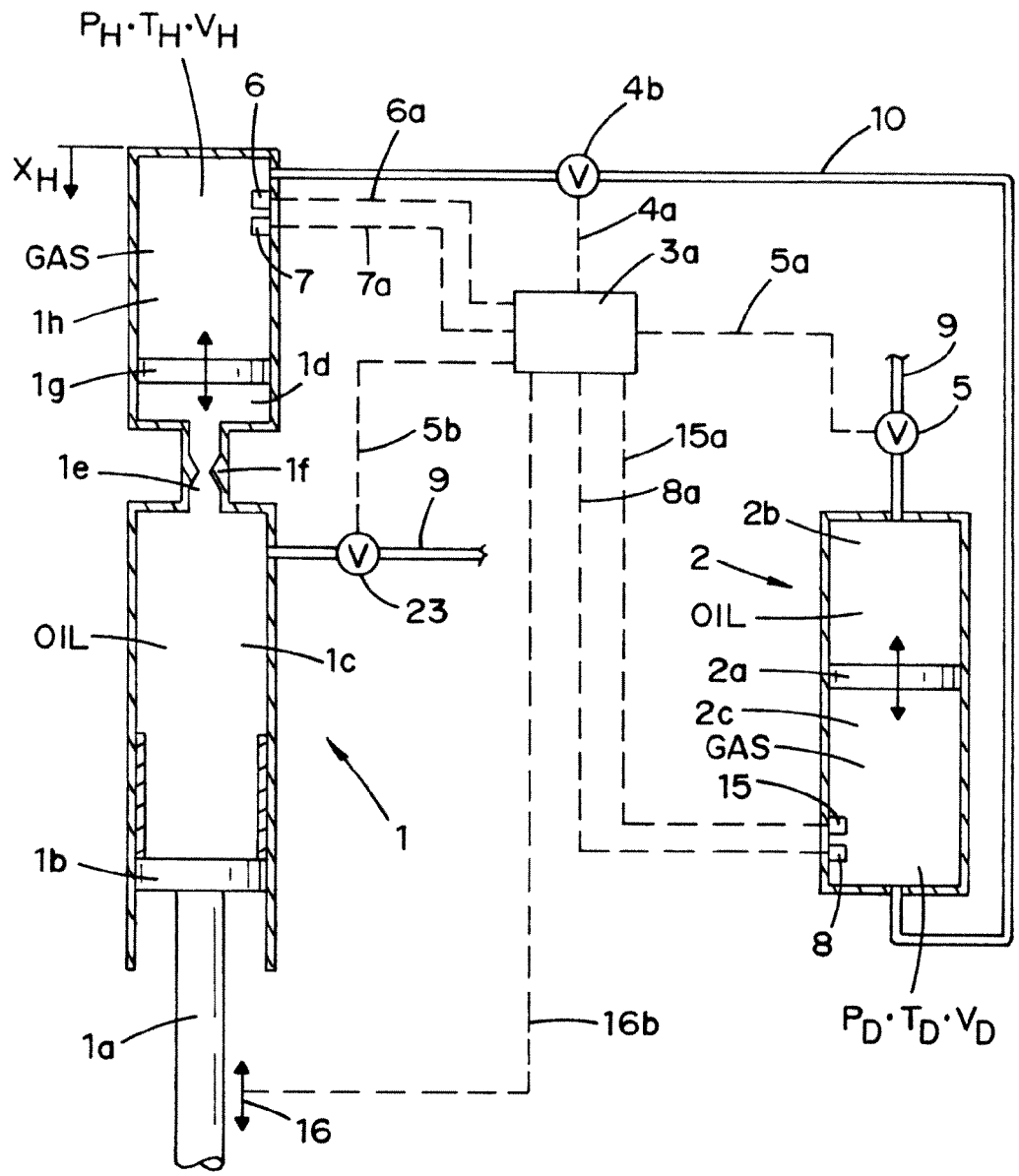
Figure 8:
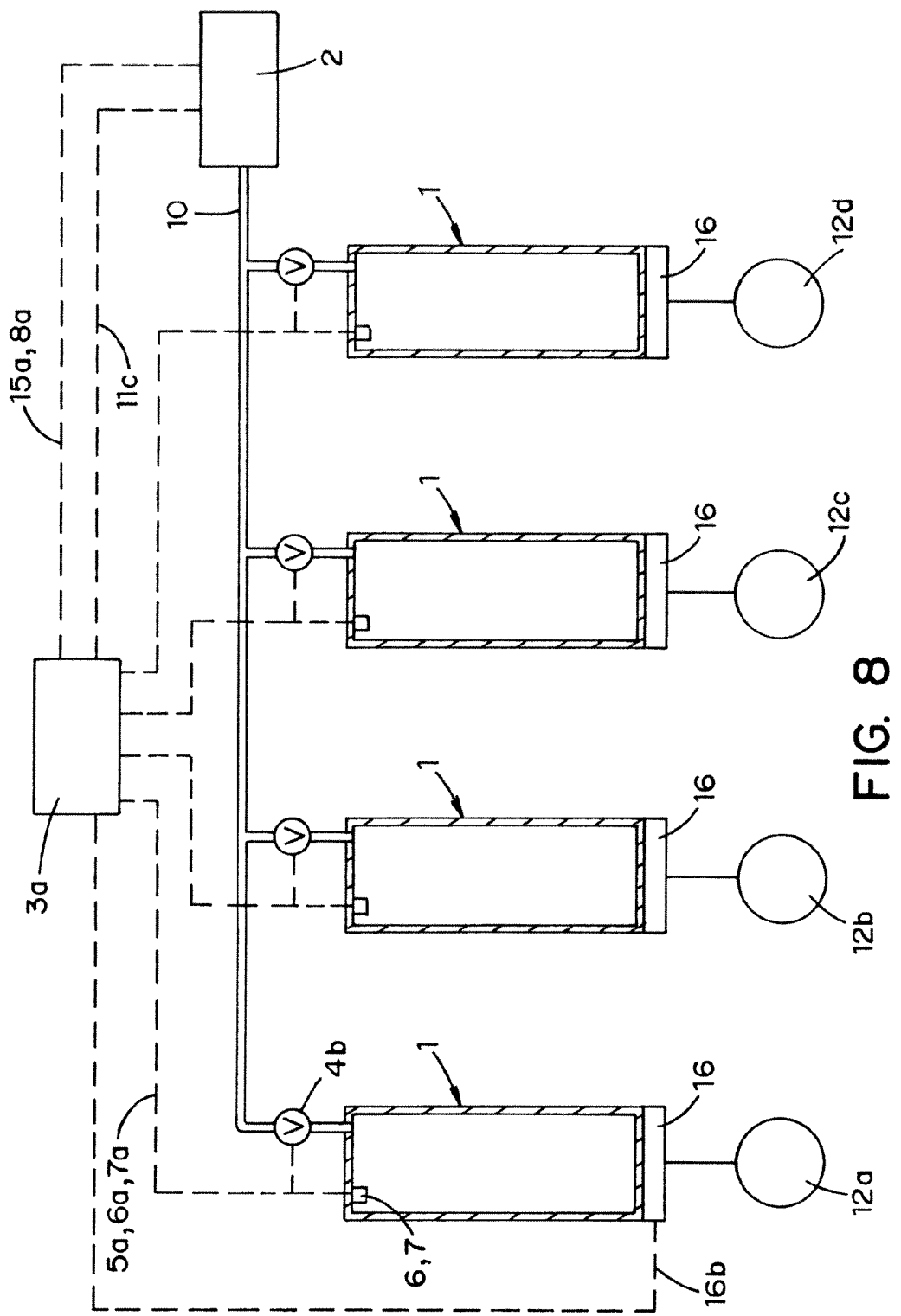
Figure 9:
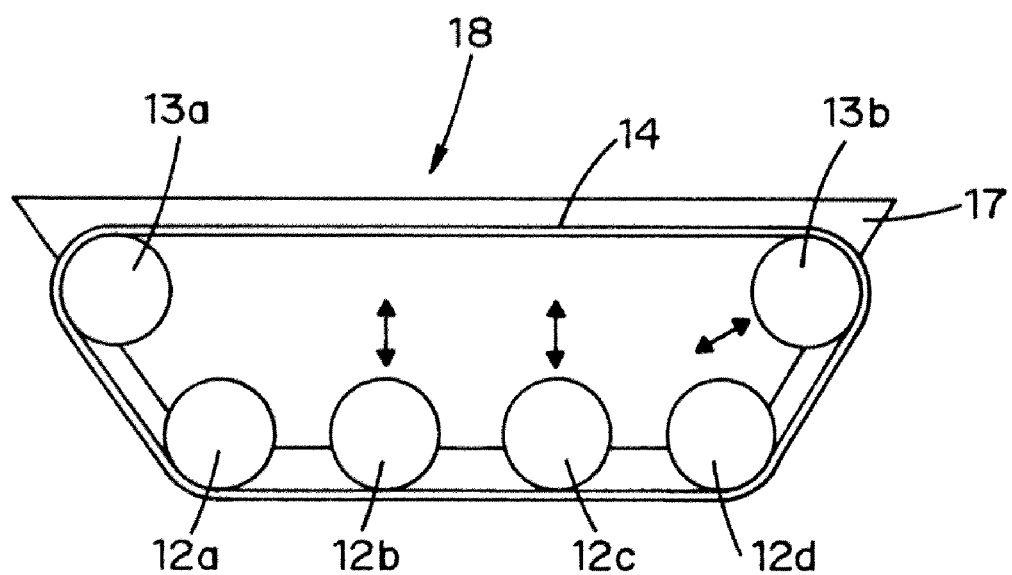
Figure 10:
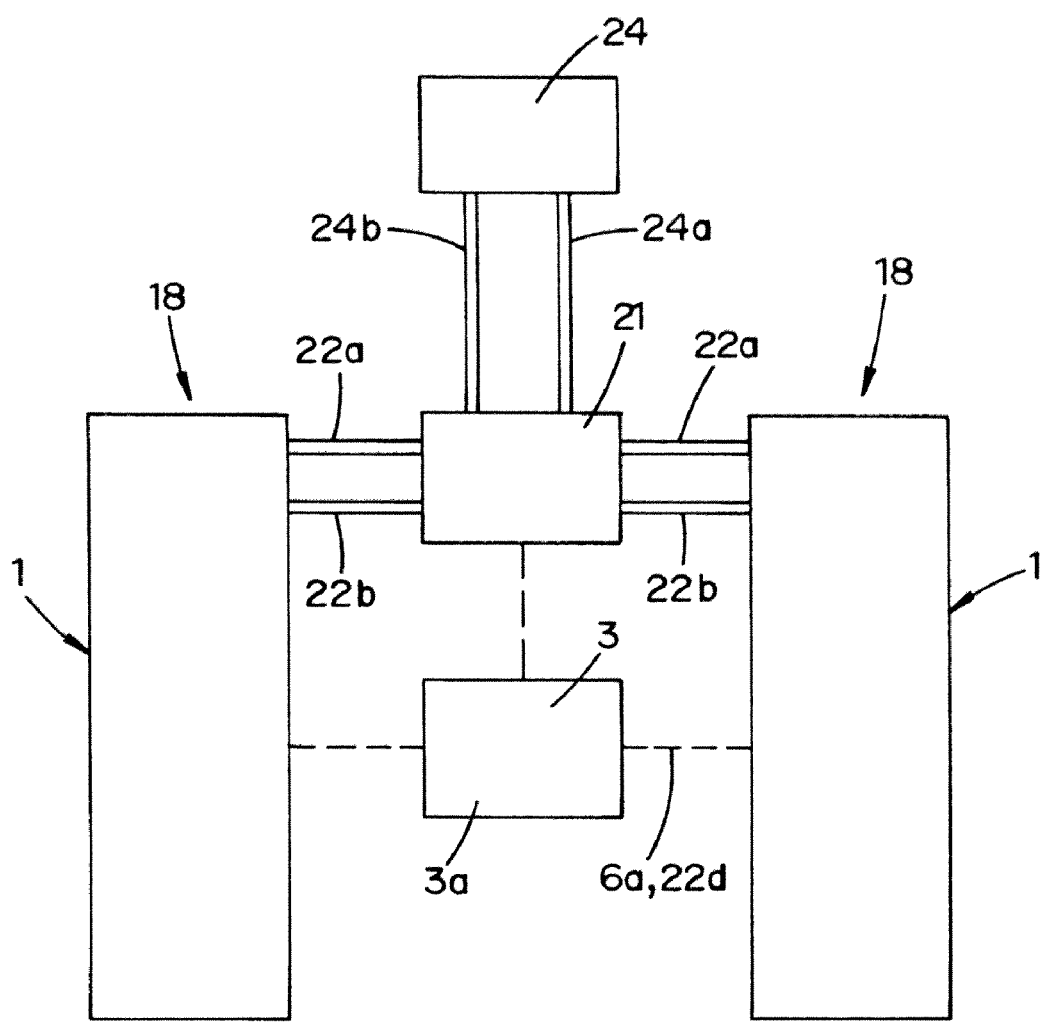
Figure 11:
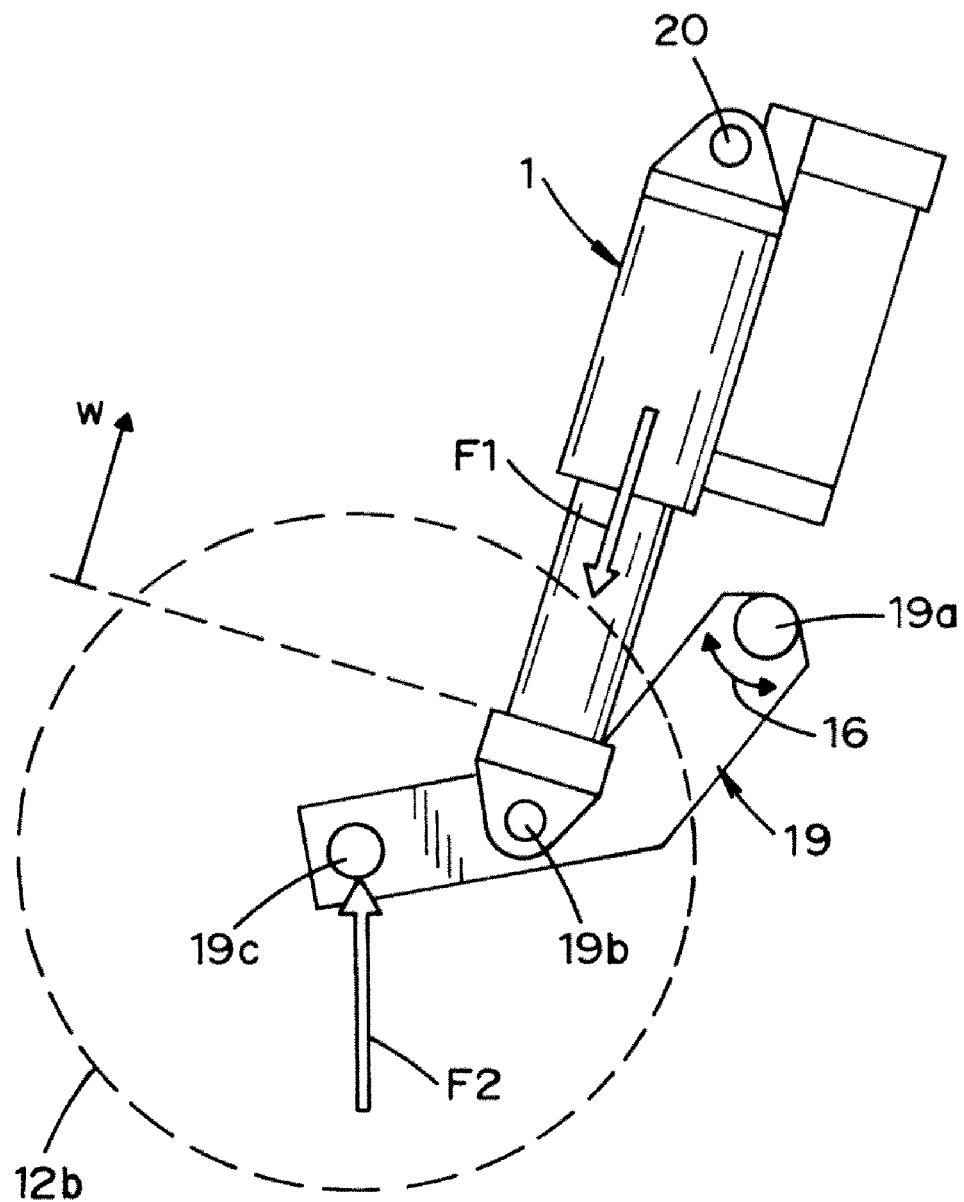
Figure 12:
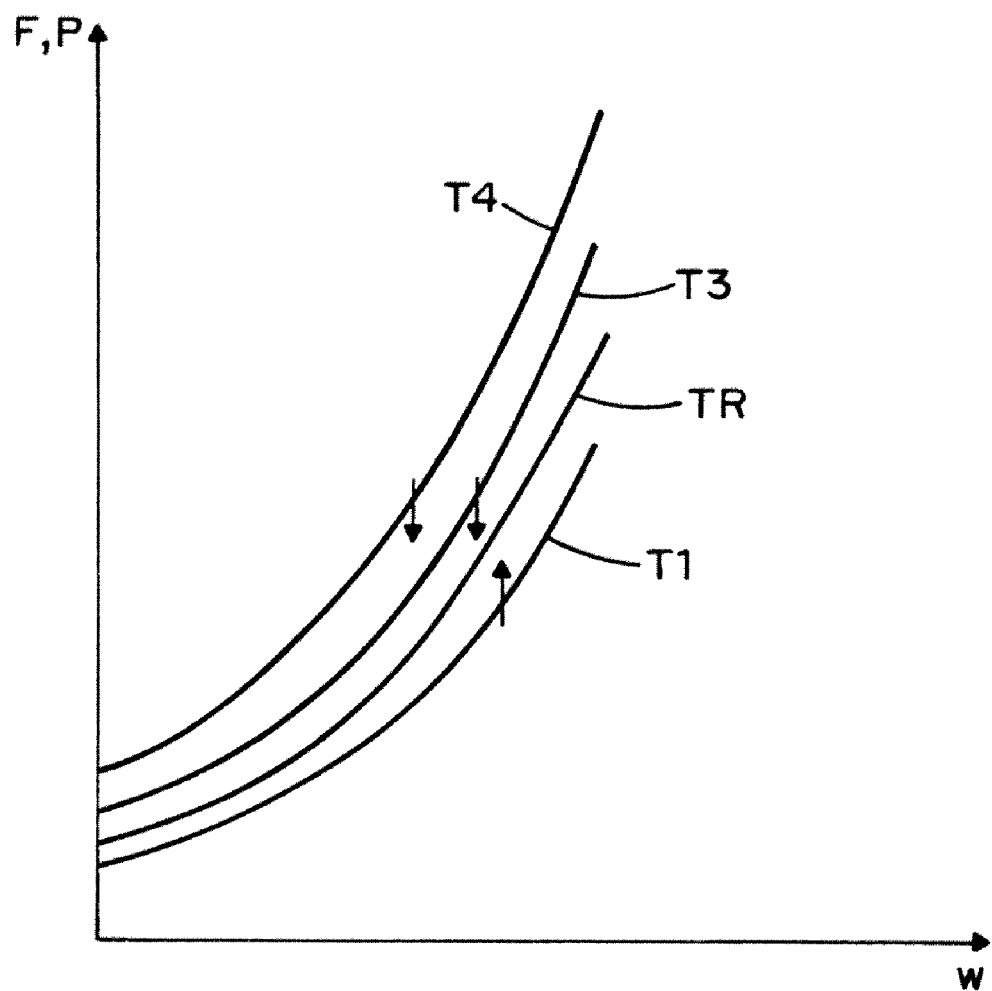
Figure 13:
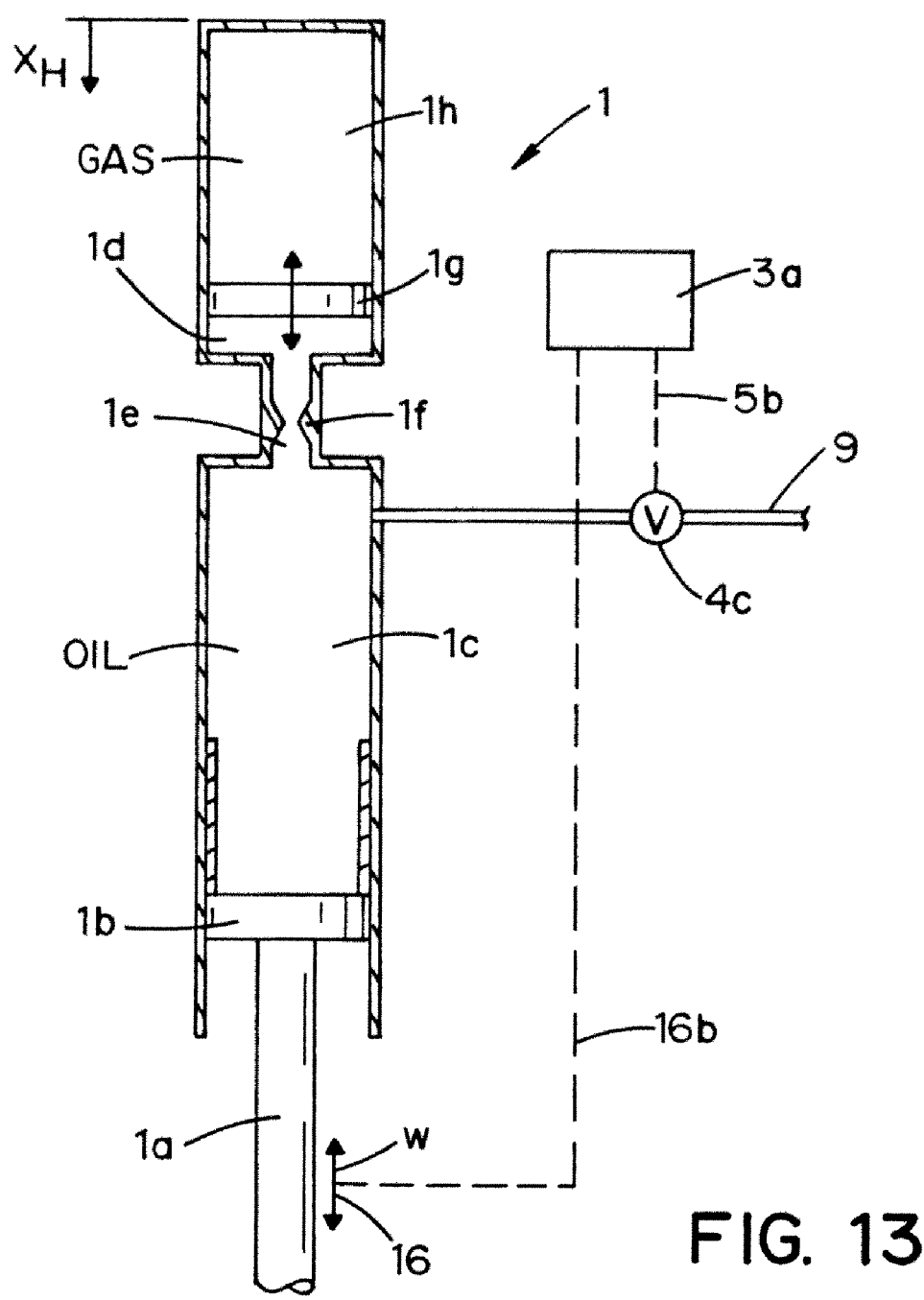

The invention will be explained in detail in the following with reference to a plurality of embodiments. There are shown:

FIG. 1 a schematic view of a hydro-pneumatic element which is connected to a cooling device;

FIG. 2 a schematic view of a hydro-pneumatic element which is connected to a regulated coolant circuit;

FIG. 3 a schematic view of a further cooled hydro-pneumatic element;

FIG. 4 a schematic view of a further cooled hydro-pneumatic element;

FIG. 5 a schematic view of a hydro-pneumatic spring damping device of a vehicle having a plurality of individual wheels, with a hydro-pneumatic element being associated with each wheel and with each hydro-pneumatic element being able to be cooled individually;

FIG. 6 a schematic view of a hydro-pneumatic spring damping device of a vehicle having a plurality of individual wheels with a hydro-pneumatic element being associated with each of them and with each hydro-pneumatic element being able to be cooled;

FIG. 7 a schematic view of a hydro-pneumatic element known from the prior art having a metering cylinder and a control device;

FIG. 8 a schematic view of a hydro-pneumatic spring damping device known from the prior art of a vehicle having a plurality of individual wheels;

FIG. 9 a schematic view of a tracked vehicle known from the prior art having two hydro-pneumatic elements;

FIG. 10 a schematic plan view of a spring module of a tracked vehicle having two controllable hydro-pneumatic elements;

FIG. 11 an embodiment of a hydro-pneumatic element;

FIG. 12 the relationship between the length of a hydro-pneumatic element and a pressure in its gas chamber at a reference temperature and at further temperatures; and FIG. 13 a schematic view of a hydro-pneumatic element with metering cylinder and control device.

The hydro-pneumatic spring damping device shown schematically in FIG. 1 includes a hydro-pneumatic element 1. The hydro-pneumatic element 1 which is illustrated in a simplified form includes a vertically displaceable connection means 1a to the lower end of which a non-illustrated wheel or wheel mount is secured. The connection means 1a is fixedly connected to a displaceably mounted piston 1b having a housing part, with the piston 1b with the housing part and also the fixed housing 1k of the hydro-pneumatic element 1 bounding a liquid volume which has a first part volume 1c and also a second part volume 1d. The first part volume 1c is also termed the first chamber and the second part volume 1d as the second chamber. The first and second part volumes 1c, 1d are fluid-conductingly connected to the restrictor 1f via an equalization line 1e. The liquid volume is preferably filled with oil. A gas volume 1h which can also be termed a third chamber, is bounded by the fixed housing 1k of the hydro-pneumatic element 1 and a partition piston 1g, with the displaceable partition piston 1g bounding the second part volume 1d and also the gas chamber $1h$. In the illustrated embodiment the upper fixed housing $1k$ is surrounded by a heat exchanger $1i$ in order to cool the surface of the housing $1k$ and to thereby remove heat from the gas chamber $1h$ and from the second oil chamber $1d$. The heat exchanger is connected to a cooling device via a coolant circuit 22 including coolant lines $22a$, $22b$ and eventually including a circulating device $22c$. In the simple embodiment the coolant circuit 22 has no active circulating device $22c$ so that the flow of the fluid in the coolant circuit 22 takes place by pure passive convection. In a more preferred embodiment the coolant circuit 22 includes an active circulating device $22c$, for example a continuously operating pump $22c$. In an advantageous design the coolant circuit 22 is connected to the coolant circuit of the vehicle so that, for example, coolant water of a vehicle cooling system flows through the coolant circuit 22 either directly or decoupled via an additional intermediate heat exchanger. In a further advantageous embodiment a mechanical valve could be disposed in the coolant circuit 22 having a temperature sensor, with the valve automatically regulating the flow of the coolant water in dependence on the temperature. A bimetallic element can for example be used as the temperature sensor, which for example detects the temperature of the coolant water flowing back out of the heat exchanger $1i$ and correspondingly changes the flow through the mechanical valve by deflection of the bimetallic element. The mechanical valve could also be designed as a mixing valve to which cooling water is supplied with two different temperatures. This purely mechanically operating valve with a mechanical temperature sensor can be designed in a plurality of ways.

The vehicle cooling system preferably has a substantially higher cooling power than the heat generation produced by the hydro-pneumatic element which has the consequence that the heat exchanger $1i$ and thus also the gas in the gas chamber $1h$ can be kept in an average temperature range determined essentially by the vehicle cooling system. This arrangement has the additional advantage that the vehicle cooling system normally already has a temperature regulation system which keeps the temperature of the coolant water in a normally predetermined temperature range. Through the use of the coolant water of the vehicle cooling system the hydro-pneumatic element 1 also has a cooling water available with a substantially predetermined temperature. Through the use of the vehicle cooling system no complicated and costly separate cooling device for the cooling of the hydro-pneumatic elements 1 is thus required in an advantageous embodiment. This arrangement has, moreover, the advantage that, on starting the vehicle, heated cooling water can be supplied to the heat exchanger $1i$ so that the gas in the gas chamber $1h$ can, if necessary, already be heated during the starting and warming up of the vehicle to an actual, in particular predetermined, operating temperature, or to the reference temperature TR. This design with the heating of the hydro-pneumatic element has the advantage that the hydro-pneumatic element 1 has the defined spring characteristic associated with the temperature TR shown in FIG. 12 very soon after the starting of the vehicle because the hydro-pneumatic element 1 has, as a result of the coolant circuit, a substantially constant operating temperature or an operating temperature within a predetermined narrow temperature range and ideally has a relatively constant reference temperature TR. Instead, of or in addition to, the above fixed housing $1k$ the lower fixed housing $1k$, i.e. the first oil chamber $1c$ and/or the restrictor $1f$, could also be cooled by the coolant circuit 22 as shown in FIG. 3. The hydro-pneumatic element 1 could, if for example necessary for the monitoring, additionally be provided with a sensor such as the temperature sensor 6 which is connected to a non-illustrated display device or regulating device 3.

FIG. 2 shows a hydro-pneumatic 1 which, in distinction to the embodiment shown in FIG. 1, has an actively regulated coolant circuit 22 in that a temperature sensor 6 measures a temperature, for example as shown the temperature in the gas chamber $1h$ and/or the temperature of the coolant line $22a$, $22b$. This measured temperature is supplied via a signal line $6a$ to a control and/or regulating device 3 which controls the circulating device $22c$ via a signal line $22d$. In a preferred embodiment the circulating device $22c$ is controlled in such a way that the temperature measured with the temperature sensor 6 is substantially constant during the operation of the vehicle. The regulating device 3 could also be a part of the engine of the vehicle and the cooling device 21 and also the circulating device $22c$ a part of the engine cooling.

The heat exchanger $1i$ can be arranged at a hydro-pneumatic element 1 in a plurality of ways such that a heat exchange results. The heat exchanger $1i$ could for example also be designed, as shown, as a spiral through which fluid flows which also extends in the inner space of the gas chamber $1h$. This heat exchanger $1i$ enables not only a cooling of the inner space of the gas chamber $1h$, but rather it can also serve to heat the inner space of the gas chamber $1h$, as already described above in connection with FIG. 1, in particular during starting or warming up of the vehicle, in particular in the early morning, when the vehicle has cooled down as a result of the previous night and the gas in the gas chamber $1h$ has a low temperature substantially below the usual operating temperature TR. For the heating up of the gas located in the inner space of the gas chamber $1h$ a heating device, in particular an electrical heating device can also be provided. The spiral $1i$ shown in FIG. 2 could for example be designed as an electrical heating device for the heating of the gas.

In the spring damping device shown in FIG. 3, in distinction to the embodiment shown in FIG. 2, only the first oil chamber $1c$ and the restrictor $1f$ are provided with a heat exchanger $1i$. Through the cooling of the oil which is thereby caused the temperature of the gas in the gas chamber $1h$ can likewise be influenced. The restrictor $1f$ can be designed as a passive element or also as a restrictor $1f$ which can be actively influenced or actively controlled. The restrictor $1f$ serves for the damping of the fluid flowing to and fro between the first oil chamber part $1c$ and the second oil chamber part $1d$, which is why a high heat output is liberated at the restrictor $1f$, in particular with a rapidly deflected hydro-pneumatic element, with this heat output preferably being directly dissipated by a heat exchanger $1i$ arranged at the restrictor $1f$.

The spring damping device shown in FIG. 4 has a hydro-pneumatic element 1, the first and second oil chamber parts $1c$ and $1d$ of which are connected to one another why a longer connection line $1l$. The restrictor $1f$ can be arranged in the region of the first or second oil chamber part $1c$, $1d$. The hydro-pneumatic element 1 shown in FIG. 4 has the advantage that the first and second oil chamber parts $1c$, $1d$ can be arranged spaced apart from one another, also spaced apart relatively far from one another, without the operating properties of the hydro-pneumatic element 1 being changed thereby. A hydro-pneumatic element 1 designed in this way has the advantage, for example, that only the first oil chamber $1c$, the movable piston $1b$ and also the connection means $1b$ have to be arranged outside of the vehicle whereas the remaining elements shown in FIG. 4 can also be arranged inside the vehicle.

FIG. 5 shows schematically a hydro-pneumatic spring damping device of a vehicle having four hydro-pneumatic elements 1. Each hydro-pneumatic element 1 includes a heat exchanger 1i, a temperature sensor 6 and optionally a sensor 16 for the determination of position, preferably a position sensor or a length sensor, and also a valve 4 associated with the respective hydro-pneumatic element 1. Using the sensor 16 for the position determination it is for example possible to measure the length of the hydro-pneumatic element or for example the height of the vehicle from the ground. The sensor 16 for the determination of position can be designed in a plurality of ways in order to measure the position or attitude of the vehicle and/or the position of a hydro-pneumatic element, for example its length or its deflection. Since a change of the length of a hydro-pneumatic element 1 immediately causes the position or the inclination of the vehicle to change, for example the height of the vehicle above the ground, the attitude or the position of the vehicle can be measured using a plurality of possibilities and from this a conclusion can be drawn on the state of the hydro-pneumatic element, in particular on its length or deflection. The coolant circuit which is connected to the cooling device 21 includes the coolant lines 22a, 22b and also a circulation device 22c. The control apparatus 3 is connected via electrical signal lines 4a, 6a, 16b and 22d to the valves 4, to the temperature sensors 6, to the circulating device 22c and also to the optional sensor 16 for the position determination. In the illustrated embodiment the heat exchanger 1i of each hydro-pneumatic element 1 can be individually and controllably supplied with coolant via the valve 4, so that the temperature of each individual hydro-pneumatic element 1 can be individually set and can in particular be kept within a predetermined temperature range of for example TR±10° C. or at a predetermined temperature TR. The sensor 16 for the position determination serves for example to detect the position of the hydro-pneumatic element 1 after having cooled down, for example in the early morning. For the cooling the sensor 16 for the determination of position is however not actually necessary. In this connection the temperature sensor 6 and also the controllable valve 4 are sufficient. A controllable valve 4 could also be dispensed with in that it is replaced by a mechanical valve having a temperature sensor, for example a bimetal element, with the temperature sensor for example measuring the temperature of the coolant water flowing out of the heat exchanger and the valve controlling the quantity of water. In this purely mechanical solution of a valve with an integrated temperature sensor it is possible to dispense with the electrical signal lines 4a, 6a.

FIG. 6 shows a further embodiment of a hydro-pneumatic spring damping device of a vehicle having four hydro-pneumatic elements 1 which, in distinction to the arrangement shown in FIG. 5 are arranged in series so the same cooling liquid flows through the hydro-pneumatic elements 1 one after the other. In the illustrated embodiment the temperature of the cooling water in the coolant line 22b is measured with a temperature sensor 6. The control and/or the regulating device is in turn connected to the temperature sensor 6 and controls the circulating device 22c, preferably in such a way that the temperature of the coolant water is kept at a substantially preset constant temperature TR.

The FIGS. 7, 8 and 9 disclose an arrangement of the same patent applicant which is already disclosed in the document WO 2005/073001 for the supply and removal of a quantity of gas to and from the inner space of the gas chamber 1h. It can also be advantageous to use this arrangement in combination with the arrangement shown in FIGS. 1 to 6. The FIGS. 7, 8 and 9 show an arrangement which serves for the feeding or removal of a quantity of gas into or from the inner space of the gas chamber 1h. The FIGS. 1 to 6 show an arrangement which serves for the cooling or heating of the gas in the gas chamber 1h. It can prove advantageous to use both methods and arrangements which are essentially mutually independent in that, for example in the early morning with cold hydro-pneumatic elements, a quantity of gas is first supplied to the hydro-pneumatic element in order to thereby, as for example shown with T1 in FIG. 12, to correct the spring characteristics of the hydro-pneumatic element 1 from T1 to TR or, in the inverse case, to remove a quantity of gas in order to correct from T4 to TR. After the supply of the quantity of gas the hydro-pneumatic element 1 could be cooled and/or heated as described with the aid of FIGS. 1 to 6. If necessary a quantity of gas can be supplied to or removed from the hydro-pneumatic element 1 at any time, in particular since the arrangement in accordance with FIGS. 5 and 6 is independent from the arrangement of FIG. 8, in the sense that both arrangements, i.e. their methods, can be operated after one another or also simultaneously. A simultaneous carrying out of both methods is possible because a quantity of gas is supplied to or removed from the inner space of the gas chamber 1h by the one method whereas, with the other method, the gas chamber 1h is preferably cooled from the outside. Both methods are thus independent from one another and if required can also be simultaneously operated.

For a better understanding, the FIGS. 7, 8 and 9 will be described once again in the following.

The hydro-pneumatic spring damping device shown schematically in FIG. 7 includes a hydro-pneumatic 1 which is flow-technically connected to a metering cylinder 2 via a control valve 4b and a line 10. The hydro-pneumatic element which is shown in a simplified representation includes a vertically displaceable connection means 1a at the lower end of which a non-illustrated wheel or wheel mounting is secured. The connection means 1a is firmly connected to a displaceably mounted piston 1b with a housing part, with the piston 1b with housing part and also the fixed housing of a hydro-pneumatic element 1 bounding a liquid volume which has a first part volume 1c and also a second part volume 1d. The first part volume 1c is also termed the first chamber, the second part volume 1d the second chamber. The first and second part volumes 1c, 1d are fluid-conductingly connected via an equalization line 1e with restrictor 1f. The liquid volume is preferably filled with oil. A gas volume 1h, also termed a third chamber, is bounded by the fixed housing of the hydro-pneumatic element 1 and by a partition piston 1g, with the displaceable partition piston 1g binding the second part volume 1d and also the gas chamber 1h. In the illustrated embodiment the hydro-pneumatic element 1 is provided with a temperature sensor 6 and also with a pressure sensor 7 in order to measure the temperature $T_H$ and also the pressure $P_H$ of the gas located in the gas chamber 1h. Both sensors 6, 7 are connected via signal lines 6a, 7a to a control device 3a. A plurality of embodiments is known in order to measure the temperature of the gas with the temperature sensor 6, with the temperature for example being able to be directly measured with a sensor arranged within the gas chamber 1h or for example indirectly in that only the housing temperature is measured at a suitable point of the hydro-pneumatic element 1. The metering cylinder 2 includes a displaceably mounted metering piston 2a which separates an oil chamber 2b from a gas filled metering volume 2c. The oil chamber 2b is connected via a control valve 5 to an oil pressure line 9. In the illustrated embodiment the metering cylinder 2 is provided with a pressure sensor 8 and also with a temperature sensor 15 in order to measure in the metering cylinder 2 the temperature and also the pressure of the gas located therein. The pressure can fluctuate strongly for example during the travel of the tracked vehicle. In order to nevertheless reliably measure the pressure value an average value is formed by the control device 3*a*, preferably during a specific time section. Both sensors 8, 15 and also the control valve 5 are connected via signal lines 8*a*, 15*a*, 5*a* to the control device 3*a*. The control valve 5 can for example be controlled by means of a time control in that the control valve 5 is opened during a predeterminable time duration in order to supply or remove a defined quantity of oil to or from the oil chamber 2*b* in this way. The arrangement shown in FIG. 1 could also have only a temperature sensor 6 or a pressure sensor 7 insofar as these would suffice in order to calculate or to determine a correction volume Vk. Nitrogen is for example used as a gas. A position or length measuring device 16 is connected via signal lines 16*b* to the control device 3*a*. A plurality of embodiments for position measurement is known. Thus, a position measurement can, for example, be directedly effected at or in the hydro-pneumatic element 1, or the position can be determined by measuring the angle of rotation of the support arm. The height of the tracked vehicle from the ground could for example also be measured and the position or length of the hydro-pneumatic element 1 derived from this value. The position measurement 16 together with a pressure measurement 7 serves for assessing the actual characteristic in dependence on the temperature of the gas in accordance with FIG. 12. With the control device 3*a* and the metering device 2 the gas volume in the gas chamber 1*h* can be tracked in such a way that a preset characteristic in accordance with FIG. 12 can always be set independently of the temperature of the gas.

The spring damping device shown in FIG. 8 has, in distinction to the spring damping device shown in FIG. 7, four hydro-pneumatic elements 1, with each hydro-pneumatic element 1 being connected to a wheel 12*a*, 12*b*, 12*c*, 12*d*, as well as a position sensor 16 and optionally a temperature sensor 6 and if required a pressure sensor 7. Each individual hydro-pneumatic element 1 can be connected via a control valve 4*b* and a common feed line 10 to the metering cylinder 2. Each hydro-pneumatic element 1 and also the metering cylinder 2 are connected in signal conducting manner to the control device 3*a* in order to control the control valves 4*b* of the hydro-pneumatic elements 1 and also the metering cylinder 2 by the control device 3*a*. A vehicle could for example have two, four, six or eight wheels 12*a*, 12*b*, 12*c*, 12*d* which are each connected via a respective hydro-pneumatic element 1 to the vehicle chassis of the vehicle. Thus, for example, an all-terrain wheeled vehicle can have, at each side in the direction of travel, four wheels 12*a*, 12*b*, 12*c*, 12*d* with hydro-pneumatic elements 1 arranged behind one another.

For the metering tasks at the individual hydro-pneumatic element 1 a plurality of metering devices 2 can also be used. Each hydro-pneumatic element 1 preferably has its own metering device 2.

The position or length measurement 16 preferably takes place separately for each hydro-pneumatic element 1. Each measurement device 16 is connected via a signal line 16*b* to the control device 3*a*, with only one of the signal lines 16*b* being shown in FIG. 8. In a simpler embodiment however it is also sufficient to provide the position measurement 16 at least one or two hydro-pneumatic elements 1, for example at the front-most or rear-most hydro-pneumatic element 1 in the direction of travel. With the aid of these measured values the position or length of the hydro-pneumatic elements 1 arranged therebetween can be calculated by interpolation so that an approximate value is also available relating to the length of these intermediate hydro-pneumatic elements 1, so that these hydro-pneumatic elements 1 can also be supplied with the correction volume of gas Vk by the metering device 2.

FIG. 9 shows schematically a track mechanism of a tracked vehicle with the recirculating track 14 being carried by the rollers 12*a*, 12*b*, 12*c*, 12*d* and also the deflection rollers 13*a*, 13*b*. The deflection rollers 13*a*, 13*b* are also termed the guide wheel or drive wheel for tracked vehicles. The rollers 12*b*, 12*c* are each connected to a common mechanism carrier 17 via a respective hydro-pneumatic element 1 in each case and are displaceably mounted in the illustrated direction. The wheels 12*a* and 12*d* have no hydro-pneumatics elements 1 and are for example connected to the mechanism carrier 17 with a convention mechanical spring. The tension of the track 14 can be influenced via the hydro-pneumatic elements 1 connected to the rollers 12*b*, 12*c*. In a further embodiment only the deflection roller 13*b* or additionally also the rollers 12*b*, 12*c* can for example be connected to a hydro-pneumatic element 1, with the rollers 12*b*, 12*c*, 13*b* being movably mounted in the illustrated direction, in order to influence the tension of the track 14 and/or the vehicle height by controlling the hydro-pneumatic elements 1. In a further embodiment all rollers 12*a*, 12*b*, 12*c*, 12*d* are respectively connected via a hydro-pneumatic element 1 to the mechanism carrier 17, with at least one of the hydro-pneumatic elements 1 being flow-technically connected to a metering device 2 and with a compensation volume thus being able to be supplied to or removed from the gas chamber 1*h* of the hydro-pneumatic elements 1, whereas the remaining hydro-pneumatic elements 1 have no fluid-conducting connection to a metering device 2 so that no compensation volume Vk can be supplied to the respective gas chamber 1*h* of these hydro-pneumatic elements 1 and these hydro-pneumatic elements cannot be controlled.

In an advantageous design these non-controllable hydro-pneumatic elements 1 also include a temperature sensor and/or a pressure sensor 6, 7 for the determination of the temperature and/or of the pressure of the gas in the respective gas chamber 1*h*. In the calculation of the compensation volume for the controllable hydro-pneumatic element 1 the state of the non-controllable hydro-pneumatic elements is taken into account by the measurement of their temperature and/or pressure and the compensation volume is calculated in such a way that the tracked vehicle has in particular a preset height and/or a preset track tension. In a further advantageous embodiment the tracked vehicle includes the arrangement shown in the FIG. 5 or 6 and optionally, in addition, the arrangement shown in the FIGS. 7 and 8.

The hydro-pneumatic spring damping device in accordance with the invention has the advantage that the heat exchanger 1*i* ensures that the hydro-pneumatic element 1 is kept at a preferably constant operating temperature in operation. It can therefore prove advantageous to simplify the arrangement described in FIGS. 7 to 9 for the supply and removal of the quantity of gas into or from the inner space of the gas chamber in such a way that simply one specific quantity of gas is fed to or removed from the gas chamber 1*h*, in particular a predetermined quantity. By preference, in this connection, neither the pressure nor the temperature is measured in the gas chamber 1*h*. The information of the sensor 16 for the position measurement is sufficient per se in order to decide whether a determined quantity of gas should be supplied to or removed from the gas chamber 1*h*. This makes it possible to considerably simplify the arrangement shown in FIG. 7. It can, moreover, also prove advantageous to supply a specific quantity of oil to or remove it from the first or the second oil chamber parts 1*c*, 1*d* in order to change the characteristic of the hydro-pneumatic element 1, in particular to correspondingly match the static height of the vehicle relative to the ground and to the situation. This can take place instead of supplying gas into the gas chamber 1h. Both the supply of gas into the gas chamber 1h and also the supply of oil into the first or second oil chamber parts 1c, 1d has the consequence that the characteristic of the hydro-pneumatic element is changed in that the spring characteristic is matched with respect to the static null position. Independently of the characteristic aimed at a quantity of oil and/or gas can be supplied to or removed from the hydro-pneumatic element 1 a plurality of times.

FIG. 10 schematically shows a plan view of a vehicle which has a running gear 18 at the left and at the right, with each running gear 18 including at least one hydro-pneumatic element 1 at which in each case a wheel or a wheel or sprocket for a track is arranged. The vehicle includes an engine cooling system 24 which is connected via coolant lines 24a, 24b forming a coolant circuit to the cooling device 21. The cooling device 21 is in turn connected via coolant lines 22a, 22b, as shown for example in FIGS. 5 and 6, to the individual hydro-pneumatic element 1. A control device 3 regulates the cooling of the hydro-pneumatic elements 1. Moreover, the vehicle could also include a gas compensation control device 3a which supplies a compensation volume to the gas chamber 1h or removes a compensation volume from it as described with the aid of the FIGS. 7 and 8.

FIG. 11 shows an embodiment of the hydro-pneumatic element 1 which is shown in simplified form in FIG. 1. A lever arm 19 is pivotally connected at the point 19a to the common running gear carrier 17 and at the point 19c to the wheel 12b. The hydro-pneumatic 1 is pivotally connected at the point 20 to the common running gear carrier 17 and the point 19b is pivotally connected to the lever arm 19. Thus the wheel 12b is resiliently mounted in a vertical direction with respect to the common running gear carrier 17, with a force F2 acting at the wheel 12b which results in a reaction force F1 in the hydro-pneumatic element 1.

FIG. 12 shows the curve of the pressure P or of the support force F in the gas chamber 1h of the hydro-pneumatic element 1 as a function of the length w at different gas temperatures T1, TR, T3, T4. This graph is shown in simplified manner. Normally the relationship between the pressure P, the support force F and the length w, also termed a characteristic has a hysteresis behaviour. This hysteresis effect is not taken into account in the following, the simplified relationship shown in FIG. 12 is assumed. The hydro-pneumatic element in accordance with the invention with the cooling device permits the hydro-pneumatic element to be held at the reference temperature TR during the operation, so that the hydro-pneumatic element has a defined spring characteristic and also a defined length in operation. The hydro-pneumatic element in accordance with the invention having a cooling device also permits the hydro-pneumatic element 1 to be heated prior to the operation, for example in that the hydro-pneumatic element is brought during the warming up of the vehicle from the curve T1 shown in FIG. 12 to the curve TR by heating up of the hydro-pneumatic element. If required the shape of the curve for the respective hydro-pneumatic element 1 can also be changed or corrected via the gas compensation control device 3a shown in FIGS. 7 and 8.

FIG. 13 shows a further hydro-pneumatic spring damping device in which, in distinction to the embodiment shown in FIG. 7, an oil compensation volume Vk can be supplied to or removed from the first and/or the second oil chamber parts 1c, 1d of at least one hydro-pneumatic element 1 via an oil metering device 4c. The oil metering device 4c is flow-technically connected to an oil supply 9. The oil metering device 4c is shown in simplified form as a valve, with the oil metering device 4c preferably being designed as an apparatus including a piston and a cylinder, so that a defined oil compensation volume Vk can be supplied or removed. The arrangement is preferably operated in that the position of the hydro-pneumatic element 1 of the position of the total vehicle is determined with a sensor 16 for the determination or position, in particular for the determination of the length w of the hydro-pneumatic element or a rotation of the hydro-pneumatic element 1 relative to a reference position, and in that the compensation control device 34a is designed in such a way that it controls the oil metering device 4c such that an oil compensation volume Vk can be supplied to or removed from the first and/or the second oil chamber parts 1c, 1d. In this way the position of the hydro-pneumatic element 1, i.e. the position of the total vehicle is changed since the oil compensation volume Vk to be supplied or removed causes the curve shown in FIG. 12 to be shifted. The heat exchanger 1i acting on the gas chamber 1h of the hydro-pneumatic element has the consequence, in an advantageous manner of operation, that the hydro-pneumatic element 1 has a substantially constant temperature after heating up, so that the position of the total vehicle can be very simply controlled, as is shown in FIG. 13, in that an oil compensation volume Vk is supplied to or removed from the first and/or the second oil chamber parts 1c, 1d or in that, as shown in FIG. 7, a gas compensation volume Vk is supplied to or removed from the gas chamber 1h. In a simplified embodiment it is not necessary to know the precise oil or gas compensation volume Vk, because the oil or gas compensation volume Vk can simply be supplied and, if the position of the hydro-pneumatic element 1 or of the vehicle detected with the sensor 16 for position determination, then deviates from the desired value, an additional oil or gas compensation volume Vk can be supplied or removed until the position corresponds approximately to the desired value. This type of regulation can prove advantageous when the hydro-pneumatic element 1 is for example very rapidly cooled down, because the vehicle for example drives through water and the hydro-pneumatic elements 1 are thus strongly cooled from the outside. As soon as the sensor 16 for the position determination of the hydro-pneumatic element of the vehicle determines a deviation from a desired value this can be corrected by an additionally supplied or removed oil or gas compensation volume Vk so that the vehicle can also essentially retain a predetermined position even with very rapidly occurring temperature changes. As soon as the vehicle has left the water the hydro-pneumatic element will normally heat up again so that the sensor 16 for the position determination of the hydro-pneumatic element 1 of the vehicle determines a deviation from the desired value and the position can thus be corrected by an additionally supplied or removed oil or gas compensation volume Vk.

An oil compensation volume Vk can not only be supplied to the first and/or the second oil chamber parts 1c, 1d, and/or a gas compensation volume Vk can not only be supplied to the gas volume 1h of the hydro-pneumatic element 1 when a position change is detected. It is likewise possible for a value which is too low or too high to be detected via the temperature sensor 6 or the pressure sensor 7 and for a compensation volume Vk to then be supplied to and/or removed from the first and/or the second oil chamber parts 1c, 1d and/or to or from the gas volume 1h. If a value which is too low or too high is detected then, in the simplest embodiment, a fixedly set compensation volume Vk can be supplied or removed. In a more sophisticated embodiment information is available with respect to the relationship between the temperature and the compensation volume Vk or between the pressure and the compensation volume Vk, for example in the form of a table. The actual temperature and the actual pressure is for example measured, with a desired temperature or a desired pressure being preset so that as a result of the actual value and the desired value a compensation volume Vk can be determined from the table which is then supplied or removed. In the simplest embodiment no information of the sensor 16 for position determination is required for this compensation process. In a further, more sophisticated, method the information of the sensor 16 for the determination of position can additionally be used in order to determine the precise position of the hydro-pneumatic element or of the vehicle. The method of the invention thus enables a plurality of ways in order, on the one hand, to keep the temperature in a hydro-pneumatic element preferably essentially constant, or within a predetermined temperature range and, on the other hand, to supply an oil compensation volume Vk to the first and/or the second oil chamber parts 1c, 1d and/or to supply a gas compensation volume Vk to the gas volume 1h of the hydro-pneumatic element in order through this measure to influence the position of the hydro-pneumatic element and/or the position of the vehicle.

The invention claimed is:

1. A hydro-pneumatic spring damping device comprising at least one hydro-pneumatic element having a gas chamber, wherein the hydro-pneumatic element includes a heat exchanger configured to cause a change in temperature of a gas in said gas chamber, said heat exchanger including a heating element to heat said gas in said gas chamber and a cooling jacket to cool said gas in said gas chamber, said cooling jacket fluidly coupled to a cooling device via a coolant circuit.

2. The hydro-pneumatic spring damping device in accordance with claim 1, characterized in that said hydro-pneumatic element includes said gas chamber, an oil chamber and a restrictor, said gas chamber, said oil chamber, said restrictor, or combinations thereof is connected to said heat exchanger.

3. The hydro-pneumatic spring damping device in accordance with claim 1, comprising a temperature sensor and a valve, said temperature sensor configured to detect said temperature of said gas in said gas chamber, a temperature of coolant in said coolant circuit, or combinations thereof, said valve configured to control a quantity of said coolant supplied to said heat exchanger, wherein said valve includes a mechanical valve and a mechanical temperature sensor.

4. The hydro-pneumatic spring damping device in accordance with claim 1, including a temperature sensor and a control device, said temperature sensor configured to determine said temperature of said gas in said gas chamber, said temperature of a coolant in said coolant circuit, and combinations thereof, said control device is designed to detect a measured value of said temperature sensor and to control a flow rate of said coolant in said coolant circuit based on said detected measured value, said control device designed to control a flow rate of said coolant through said coolant circuit in such a way that said gas in said gas chamber is kept within a predetermined temperature range.

5. The hydro-pneumatic spring damping device in accordance with claim 2, characterized in that said coolant circuit is designed such that at least two of said hydro-pneumatic elements can be individually cooled based on said temperature measured by said temperature sensor of said respective hydro-pneumatic element.

6. The hydro-pneumatic spring damping device in accordance with claim 1, characterized in that said heat exchangers of a plurality of hydro-pneumatic elements are connected in series one after the other to said coolant circuit.

7. The hydro-pneumatic spring damping device in accordance with claim 1, characterized in that said heat exchangers of a plurality of hydro-pneumatic elements are connected mutually in parallel to said coolant circuit.

8. The hydro-pneumatic spring damping device in accordance with claim 6, characterized in that all of said hydro-pneumatic elements that are connected to said coolant circuit form said cooling device.

9. The hydro-pneumatic spring damping device in accordance with claim 1, including a gas compensation control device, said chamber of at least one of said hydro-pneumatic element is fluidly connected to a control valve, said control valve fluidly connected to a metering device, said metering device including a sensor for determining a position or length of a vertically displaceable connection means, said metering device including a gas compensation control device, said gas compensation control device designed to control said metering device and said control valve to control a volume of gas that is supplied to or removed from said gas chamber.

10. The hydro-pneumatic spring damping device in accordance with claim 1, including a gas compensation control device, said chamber of at least one of said hydro-pneumatic element is fluidly connected to a metering device, said metering device including a sensor for determining a pressure of said gas in said gas chamber, said metering device including a sensor for determining a position or length of a vertically displaceable connection means, said metering device including a gas compensation control device, said gas compensation control device designed to detect measured values of said sensor, and, based on said detected measured values, controls said metering device and said control valve in such a way that a compensation volume can be fed to or re-moved from said gas chamber.

11. The hydro-pneumatic spring damping device in accordance with claim 1, wherein a first oil chamber parts, a second oil chamber parts, or combinations thereof of at least one of said hydro-pneumatic element is flow-technically is fluidly connected by an oil metering device to an oil supply, and further including a sensor and a compensation control device, said sensor designed to determine a position or length of a vertically displaceable connection means, said compensation control device designed to control said oil metering device in such a way that an oil compensation volume can be supplied to or removed from said first oil chamber parts, the second oil chamber parts, or combinations thereof based on information detected by said sensor.

12. A hydro-pneumatic spring damping device comprising at least one hydro-pneumatic element having a gas chamber, a liquid chamber, a flow restrictor, and a heat exchanger, said flow restrictor limiting a flow of liquid between said gas chamber and said liquid chamber, said heat exchanger controlling temperature of one or more of gas in said gas chamber, said liquid in said liquid chamber, and said liquid in said flow restrictor, said heat exchanger including a heating element to heat said gas in said gas chamber and a cooling jacket to cool said gas in said gas chamber, said cooling jacket fluidly coupled to a cooling device via a coolant circuit.

13. The hydro-pneumatic spring damping device as defined in claim 12, including a temperature sensor and a coolant flow controller, said temperature sensor positioned on said gas chamber, said coolant circuit, or combinations thereof to detect a temperature of gas in said gas chamber, a temperature of coolant in said coolant circuit, or combinations thereof, said coolant flow controller controlling a flow rate of coolant to said heat exchanger based on said temperature detected by said temperature sensor.

14. The hydro-pneumatic spring damping device as defined in claim 13, wherein said coolant flow controller controls said flow rate of said coolant to maintain said temperature of said gas in said gas chamber within a predetermined temperature range.

15. The hydro-pneumatic spring damping device as defined in claim 14, including a gas compensation control device, said gas chamber fluidly connected to a control valve, said control valve fluidly connected to a metering device, said metering device including a sensor for determining a position or length of a vertically displaceable connection means, said metering device including a gas compensation control device, said gas compensation control device designed to control said metering device and said control valve to control a volume of gas that is supplied to or removed from said gas chamber.

* * * * *